United States Patent [19]

Valgin et al.

[11] 4,252,938

[45] Feb. 24, 1981

[54] ACID AGENT FROM PHENOLIC REACTANTS ALDEHYDES AND ARYL SULPHONIC ACIDS AND PROCESS FOR PRODUCING THE SAME

[76] Inventors: Vasily D. Valgin, ulitsa Truda, 18, kv. 4; Alexandr M. Vasilenko, ulitsa Usti na Labe, 2, kv. 15, both of Vladimir; Dmitry V. Valgin, poselok Khljupino, 6, kv. 2, Moskovskaya oblast, Odintsovsky raion; Ljudmila A. Istratova, ulitsa Usti na Labe, 22, kv. 14, Vladimir, all of U.S.S.R.

[21] Appl. No.: 828,771

[22] Filed: Aug. 29, 1977

[30] Foreign Application Priority Data

Sep. 1, 1976 [SU] U.S.S.R. ................................. 2411951
Sep. 10, 1976 [SU] U.S.S.R. ................................. 2405740

[51] Int. Cl.$^3$ .......................... C08G 8/06; C08G 8/10; C08G 8/22
[52] U.S. Cl. ................................... 528/150; 528/141; 528/154; 528/167; 528/146; 528/153; 528/158; 528/162; 528/164; 528/171; 528/172
[58] Field of Search ............... 528/150, 158, 167, 171, 528/153, 154, 162, 164, 172, 141, 146

[56] References Cited

U.S. PATENT DOCUMENTS

| | | | |
|---|---|---|---|
| 2,289,278 | 7/1942 | Voss et al. | 528/171 |
| 2,843,564 | 7/1958 | Schultheis et al. | 528/158 |
| 4,079,040 | 3/1978 | Ribka et al. | 528/171 |
| 4,102,832 | 7/1978 | Weissenfels et al. | 528/171 |

*Primary Examiner*—Lester L. Lee
*Attorney, Agent, or Firm*—Lackenbach, Lilling & Siegel

[57] ABSTRACT

An acid agent comprises a liquid water-insoluble product of concurrent reaction of:
(a) one mole of an hydroxy(R)-methyl derivative of phenol in which 0.4-2.0 moles of HO—CH(R)- groups are present per one mole of phenol, wherein R equals H—, $CH_3$—, or
(b) one mole of phenol and 0.3-2.0 moles of an aldehyde and
(c) 0.03-100.0 moles of an aryl sulphonic acid, having an acid number from 10 to 300 (mg.KOH/g) with a maximum water content of 35% by weight.

The process of reacting said components is conducted in a flow reactor for 0.1-10 minutes at 50°-150° C.

The acid agent according to the invention may be modified with other substances, such as amines, alcohols, or acids to impart additional useful properties thereto. The acid agent has low viscosity, low corrosive activity, improves the strength of phenol-formaldehyde resins cured therewith by 30% and lowers their water absorption capacity by 2-10 times.

18 Claims, No Drawings

4,252,938

ACID AGENT FROM PHENOLIC REACTANTS ALDEHYDES AND ARYL SULPHONIC ACIDS AND PROCESS FOR PRODUCING THE SAME

FIELD OF THE INVENTION

The invention relates to the field of synthetic oligomers, and more specifically to acid agents and processes for producing same. Acid agents are used as catalysts for curing phenol-aldehyde resorcinols.

BACKGROUND OF THE INVENTION

Known in the art are processes for producing phenol-aldehyde foamed plastics using acid agents as catalysts, which are products of condensation of sulphonated phenol with nitrogen-containing organic compounds of an amine, and amide class, and with formaldehyde in the form of an aqueous solution.

The acid agent is produced by a process comprising reacting sulphuric acid, phenol, a nitrogen-containing compound and an aldehyde in a batch reactor in three stages. In the first stage, phenol is reacted with sulphuric acid at 100°-110° C. for 2-24 hours. In the second stage sulphonated phenol is reacted with a nitrogen-containing compound at 40°-70° C. for 0.5-1 hour. In the third stage, the resultant product is reacted with an aldehyde at 40°-70° C. for 1-2 hours.

This process is deficient in its intermittent performance, long duration of production cycle and considerable labor and power consumption.

Nitrogen-containing compounds in the composition of the acid agent reduce corrosive activity of cured phenol-aldehyde resins and function as acceptors of formaldehyde released during the curing of phenol-formaldehyde resins.

The acid agents of this type are deficient in that phenol-aldehyde resins cured by using them are low in strength and brittle.

Known in the art is a process for producing an acid agent in which a batch reactor in two stages: in the first stage, phenol is reacted with sulphuric acid at 120°-150° C. for 0.5-1 hour; in the second stage, the product resulting from the first stage is reacted with formaldehyde at 30°-50° C. for 1-2 hours.

This process is deficient in its intermittent performance and considerable power consumption necessary to effect intense stirring of large volumes.

The acid agent produced by that process is a weak acceptor of formaldehyde released during the curing of phenol-formaldehyde resorcinols and imparts an elevated corrosive activity thereto.

It is also known to produce an acid agent by condensing phenol with an aldehyde at 95°-100° C. for several hours, with subsequent sulphonation of the resultant novolac with sulphuric acid at 100°-120° C. for 2-6 hours.

This process is deficient in that it is intermittent, has a long production cycle and requires much labor and power.

The disadvantages of such acid agents include high viscosity of sulphonated novolac, the presence of free sulphuric acid therein, sometimes in great quantities, and low content of phenolic nuclei unsubstituted with a sulphogroup, which would function as active acceptor of formaldehyde. To lower the viscosity, such acid agent is to be diluted with water thus increasing its corrosive activity.

Therefore, the following disadvantages are inherent in all known acid agents used as catalysts for curing phenol-formaldehyde resorcinols:
1. Restricted opportunity of imparting useful properties to cured phenol-formaldehyde resins.
2. High viscosity.
3. Elevated corrosive activity.
4. Reduced catalytic activity.

Known in the art is an acid agent comprising a combined aryl sulphonic acid and phenol-aldehyde novolac which is obtained by reacting an aryl sulphonic acid and oxy-(R)-methyl derivative of phenol. The following disadvantages are inherent in this process: long production cycle, the need to use cumbersome reactors for conducting the process, which should be manufactured of acid resistant materials, considerable power and labor consumption.

OBJECT OF THE INVENTION

It is an object of the Invention to provide a continuous process for producing an acid agent which is characterized by high output and efficiency and enables the production of a low viscosity product exhibiting reduced corrosive activity and imparting properties to cured phenol-aldehyde resins.

SUMMARY OF THE INVENTION

The invention resides in the provision of an acid agent based upon an oxymethyl derivative of phenol, phenol, an aldehyde and an aryl sulphonic acid, which is characterized by a liquid water-insoluble reaction product of:

(a) one mole of an hydroxy(R)-methyl derivative of phenol in which 0.4-2.0 moles of HO—CH(R)— groups are present per one mole of phenol, wherein R equals H—,CH$_3$—, or (b) one mole of phenol and 0.3-2.0 moles of an aldehyde and (c) 0.03-100.0 moles of an aryl sulphonic acid, having an acid number from 10-300 (mg.KOH/g) and maximum water content of 35% by weight.

The acid agent according to the invention has the following advantages over the prior art acid agents: low viscosity (maximum 100 P); good acceptor capacity with respect to an aldehyde released during the curing of phenol-aldehyde resorcinols; lower corrosive activity.

In using the acid agent according to the invention as a catalyst for curing phenol-aldehyde resins, an improvement of physical and mechanical properties of cured resins was noted; thus ultimate compressive strength was improved by 10-30%. Moreover, cured products had substantially reduced water and moisture absorption capacity (by 200-1000% lower).

The reaction of the above-mentioned component is conducted in a continuous flow reactor for 0.1-10 minutes at 50°-150° C.

DETAILED DESCRIPTION OF THE INVENTION

The acid agent may be modified with various substances, such as an alcohol, a nitrogen-containing compound, a metal sulphonate, ortho-phosphoric acid and other appropriate substances which are selected depending on useful properties to be imparted to the acid agent. Accordingly, various embodiments of the acid agent according to the invention may be obtained.

According to the invention, there is contemplated an acid agent which is a reaction product of an hydroxy(R)-methyl derivative of phenol in which 0.7–2.0 moles of said HO—CH(R)— groups are present per one mole of phenol and an aryl sulphonic acid containing a maximum of 50% by weight of an aliphatic monomeric, biatomic oligomeric or polyatomic alcohol.

According to the invention, the acid agent is a product of reaction of phenol and an aldehyde in a molar ratio of 1:0.7–2.0 and an aryl sulphonic acid containing a maximum of 50% by weight of an aliphatic monomeric, biatomic oligomeric or polyatomic alcohol.

Aliphatic monomeric biatomic alcohols may comprise ethylene and propylene glycols and butane diols.

The examples of biatomic oligomeric alcohols are polymerization products of alkylene oxides, including diethylene-, triethylene- and polyethylene glycols with molecular weights up to 500.

Glycerin may be used as the polyatomic alcohol.

Addition of the above-mentioned alcohols to the acid agent reduces its viscosity and improves reactivity in curing. The alcohols may be added either to the reaction mixture in the course of production of the acid agent or to the finished acid agent. In case the alcohols are added during the production of the acid agent, that is to the reaction mixture, the stability of acid agent is improved.

According to the invention, the acid agent may include a nitrogen-containing compound selected from the class of amines and amides. Addition of nitrogen-containing compounds to the acid agent in a maximum amount of 0.8 moles provides for additional reduction of corrosive activity and improves the acceptor properties of the agent with respect to an aldehyde released during the course of curing phenol-aldehyde resins.

An acid agent in which a part of an aryl sulphonic acid is neutralized with the formation of a metal sulphonate exhibits lowered corrosive activity. Neutralizing substances comprise oxides, hydroxides, carbonates and borates, that is bases and salts of weak acids of metals such as barium, calcium, copper, silver, zinc, tin, iron and others which are generally used in a maximum quantity of 0.1 moles per one mole of an aryl sulphonic acid. Phenol-aldehyde resins cured with the acid agent containing metal sulphonates exhibit lowered water and moisture absorption.

According to the invention, the acid agent contains a maximum of 20% by weight of ortho-phosphoric or boric acid which is generally added to the finished acid agent. In a number of applications the modifier may be, however, added during the production of the acid agent. Phenol-aldehyde resins cured with such acid agent become more fire resistant.

The quantity of the above-mentioned additives to the acid agent should comply with its insolubility in water, liquid state and an acid number from 10 to 300 (mg.KOH/g), preferably from 20 to 150 (mg.KOH/g) with a maximum water content of 35% by weight.

According to the invention, the acid agent is produced by a continuous process comprising concurrently reacting:

(a) one mole of an hydroxy(R)-methyl derivative of phenol in which 0.4–2.0 moles of HO—CH(R)—per one mole of phenol, wherein R equals H—, CH$_3$—, or (b) one mole of phenol and 0.3–2.0 moles of an aldehyde and (c) 0.03–100.0 moles of an aryl sulphonic acid, in a flow reactor for 0.1–10 minutes at 50°–150° C.

The term "flow" as applied to the reactor means that the reactor operates on the basis of "ideal displacement", that is continuously metered starting components completely displace the reaction product.

The residence time of reaction mixture in the reactor should not be shorter than the time required for the completion of the exothermic reaction. Failure to comply with this condition results in a heterogeneous product. By selecting temperature and reactor size, the time for the completion of exothermic reaction for 0.1–10 minutes, preferably 0.3–1.0 minute should be obtained, within the residence time of the reaction mixture in the reactor.

The acid agent formed in the flow reactor as a result of the reaction of an hydroxy(R)-methyl derivative of phenol or phenol and an aldehyde, and an aryl sulphonic acid, contains free aryl sulphonic acid, phenol-aldehyde novolac and some quantity of aryl sulphonic acid built in the structure of phenol-aldehyde oligomer. This composition determines the insolubility of the acid agent in water, that is its ability of stratifying water-insoluble novolac when diluted with water. This also explains its increased reactivity. The acid agent produced by the process according to the invention has more ordered structure, that is a narrower molecular-mass distribution and does not contain impurities of high molecular branched structures which impart elevated viscosity. All starting components are readily available.

The above-mentioned hydroxy(R)-methyl derivatives of phenol are monomers or resins generally obtained by condensing phenol, or a mixture of phenols and an aldehyde, or a mixture of aldehydes in the presence of a catalyst and are characterized by the presence of oxy-(R)-methyl groups at phenolic nuclei, where R equals H— or CH$_3$—, having a maximum viscosity of 100 P at 20° C. In all applications, to produce the acid agent, hydroxy methyl derivatives of phenol are preferably used which are obtained by condensing phenol proper with formaldehyde in the presence of a base as catalyst. Hydroxymethyl derivatives of phenol may, however, be obtained by catalytically condensing phenol with other aldehydes, such as benzaldehyde or butyl aldehyde, but in such case longer synthesis time limits their use.

For producing the acid agent, hydroxy(R)-methyl derivatives of phenol are preferably used in which 0.4–2.0 moles of HO—CH(R)—groups are present per one mole of phenol, wherein R equals H—, CH$_3$—.

Hydroxy(R)-methyl derivatives of phenol in which a molar ratio of an aldehyde to phenol is greater than 0.7 are preferably used upon adding an alcohol thereto. The addition of an alcohol improves the stability of the acid agent.

Phenol used to produce the acid agent according to the invention may comprise phenol proper as well as derivatives thereof, such as cresol, resorcinol, naphthol and mixtures thereof.

Aldehyde used to produce the acid agent according to the invention may comprise formaldehyde (formaline, paraform aldehyde acetaldehyde, benzaldehyde and others, but preferably formaldehyde and acetaldehyde are used as most readily available.

Aryl sulphonic acid used for the production of the acid agent according to the invention may comprise an aromatic sulphonic acid, such as benzene-, toluene-, phenolcresol-, naphthalene-, naphthol sulphonic acid or mixtures thereof.

As mentioned above, modifiers may be added to the acid agent according to the invention to impart additional useful properties thereto.

To reduce corrosive activity and improve acceptor capacity with respect to formaldehyde released during the curing of phenol-aldehyde resins, a maximum of 0.8 moles of a nitrogen-containing compound of the amine or amide type are added to the acid agent according to the invention. The nitrogen-containing compound may be added either to the reaction mixture during the production of the acid agent or to the finished acid agent.

To reduce viscosity, improve reactivity and stability of the acid agent according to the invention, the process is conducted in the presence of a maximum of 50% by weight of an aliphatic monomeric, or biatomic oligomeric, or polyatomic alcohol.

During the production of the acid agent according to the invention, bases or salts of weak acids of metals such as those forming metal sulphonates with an aryl sulphonic acid may be added to the reaction mixture of starting components in a maximum amount of 0.1 mole per one mole of aryl sulphonic acid. This step provides for further reduction of corrosive activity of the acid agent.

To impart additional fire resistance to polymeric compositions after curing, up to 20% by weight of ortho-phosphoric or boric acid are added to the acid agent according to the invention. In this case, an aqueous solution of ortho-phosphoric acid is preferably used as a solvent for aryl sulphonic acid.

To reduce corrosive activity and improve reactivity of the acid agent according to the invention, a part of water is removed from the product by vacuum drying, the viscosity of the acid agent not exceeding 100 P at 20° C.

During the production o the acid agent according to the invention, hydroxy(R)-methyl derivatives of phenol may be used from which part of the water is removed, e.g. by vacuum drying, the viscosity is not exceeding 100 P at 20° C.

The process for producing the acid agent according to the invention is conducted in accordance with a most advanced technique which determines high output with lower labor and power consumption compared to the prior art process.

The acid agent obtained by the process according to the invention has the following advantages: low viscosity (maximum 100 P), good acceptor capacity with respect to an aldehyde relased during the curing of phenol-aldehyde resorcinols, and lower corrosive activity compared to prior art acid agents.

In using the acid agent according to the invention as a catalyst for curing resorcinols, an improvement of physical and mechanical characteristics of cured resins was noted; thus ultimate compressive strength was improved by 10–30%. Moreover, the cured products exhibited substantially lower water absorption capacity (by 200–1000% lower). The acid agent according to the invention may be used in the leather industry as synthetic tanning agent.

The invention will be better understood from the following examples which are tabulated.

Table 1 gives examples of the preparation of hydroxy(R)-methyl derivatives of phenol.

Tables 2,3 give examples of the preparation of acid agents.

In all the examples an aryl sulphonic acid was used in the form of a saturated aqueous or aliphatic alcohol solution. Hydroxy(R)-methyl derivatives of phenol, phenol and an aldehyde were fed to a flow reactor in liquid state.

Starting components in accordance with formulations, were fed by means of a metering pump, to the reactor, in which the residence time of the reaction mixture was maintained within the range from 0.1 to 10 minutes and temperature, within the range from 50° to 150° C.

The following terms and abbreviations are used in Tables 1,2 and 3:
formalin—aquaeous solution of formaldehyde (37%);
tricresol—mixture of isomeric cresols;
BSA—benzene sulphonic acid;
PSA—mixture of isomeric phenol sulphonic acids;
NLSA—2naphthol-7-sulphonic acid;
NNSA—mixture of isomeric naphthalene sulphonic acids;
TSA—toluene sulphonic acid;
PG—propylene glycol;
EG—ethylene glycol
DEG—diethylene glycol;
PEG—400—polyethylene glycol (Mol. wt. 400);
GL—glycerin;
BD—1,4-butane diol;
DTEG—dimethyl tetraethylene glycol.

TABLE 1

Preparation of Hydroxy-(R)-Methyl Derivatives of Phenol wherin R equals H—$CH_3$—

| Example No. 1 | Phenol, moles 2 | Phenolic components, moles 3 | Fromaline (37%), moles 4 | Aldehyde components, moles 5 | Alkaline catalyst, moles 6 | Temperature, °C. 7 | Condensation time h 8 | Water content, % 9 | Viscosity at 20° C. cP 10 |
|---|---|---|---|---|---|---|---|---|---|
| 1 | 1.0 | — | 0.4 | — | 0.035 NaOH | 80 | 0.25 | 15.91 | 16 |
| 2 | 1.0 | — | 0.6 | — | 0.018 Ba(OH)$_2$ | 80 | 1 | 21.59 | 19 |
| 3 | 1.0 | — | 0.8 | — | 0.018 Ba(OH)$_2$ | 80 | 1 | 25.54 | 24 |
| 4 | 1.0 | — | 0.8 | — | 0.035 NaOH | 80 | 1 | 26.46 | 20 |
| 5 | 1.0 | — | 1.0 | — | 0.018 Ba(OH)$_2$ | 80 | 1 | 28.80 | 27 |
| 6 | 1.0 | — | 2.0 | — | 0.035 Ba(OH)$_2$ | 85 | 1 | 14.20 | 2400 |
| 7 | — | 0.5 M-cresol 0.5 P-cresol | 0.8 | — | 0.035 NaOH | 75 | 0.5 | 24.47 | 105 |
| 8 | 1.0 | — | 0.25 | 0.5 paraformaldehyde 90% | 0.018 Ba(OH)$_2$ | 80 | 2 | 11.38 | 47 |
| 9 | 1.0 | — | 0.5 | 0.27 acetaldehyde | 0.018 Ba(OH)$_2$ | 95 | 14 | 18.58 | 285 |
| 10 | 0.6 | 0.4 resorcinol 0.375 m-cresol | 0.6 | — | 0.018 Ba(OH)$_2$ | 80 | 1 | 17.29 | 57 |

TABLE 1-continued

Preparation of Hydroxy-(R)-Methyl Derivatives of Phenol wherin R equals H—CH$_3$—

| Example No. 1 | Phenol, moles 2 | Phenolic components, moles 3 | Formaline (37%), moles 4 | Aldehyde components, moles 5 | Alkaline catalyst, moles 6 | Temperature, °C. 7 | Condensation time h 8 | Water content, % 9 | Viscosity at 20° C. cP 10 |
|---|---|---|---|---|---|---|---|---|---|
| 11 | — | 0.375 p-cresol 0.25 resorcinol | 0.6 | — | 0.035 NaOH | 75 | 0.5 | 20.65 | 107 |
| 12 | 1.0 | — | 0.6 | — | 0.018 Ba(OH)$_2$ | 80 | 1 | 0.75 | 180 |
| 13 | — | 0.625 tricresol 0.375 resorcinol | | 0.625 acetaldehyde (75%) | 0.013 Ba(OH)$_2$ | 75 | 12 | 7.36 | 320 |
| 14 | 1.0 | — | 1.5 | — | 0.020 Ba(OH)$_2$ | 80 | 2.5 | 35.82 | 55 |

TABLE 2

Preparation of Acid Agent from Aryl Sulphonic Acid and Hydroxy (R)-Methyl Derivative of Phenol

| Example No. 1 | Aryl sulphonic acid, moles 2 | Oxy-(R)-methyl derivatives of phenol from the Examples of TABLE 1 3 | Neutralizer, moles 4 | Nitrogen-containing compound, moles 5 | Diluent, % by weight 6 | Water content, % by weight 7 | Acid number mg. KOH/g 8 | Viscosity at 20° C. 9 |
|---|---|---|---|---|---|---|---|---|
| 1 | 0.06 BSA | 3 | — | — | 48.5 DEG | 16.60 | 10 | 455 |
| 2 | 100.0 BSA | 6 | — | — | 9.1 DEG | 3.07 | 296 | 200 |
| 3 | 100.0 PSA | 3 | — | — | 9.1 DEG | 10.60 | 253 | 2010 |
| 4 | 1.0 PSA | 3 | — | — | 9.1 DEG | 19.85 | 137 | 1070 |
| 5 | 0.1 BSA | 1 | — | — | 16.7 DEG | 15.85 | 29 | 120 |
| 6 | 1.0 TSA | 3 | — | — | 23.1 DEG | 13.08 | 126 | 525 |
| 7 | 1.0 NLSA | 5 | — | — | 50.0 DEG | 8.73 | 68 | 215 |
| 8 | 1.0 NNSA | 3 | — | — | 33.3 DEG | 13.20 | 108 | 620 |
| 9 | 0.9 BSA 0.1 PSA | 1 | 0.01 CuCO$_3$ | 0.02 urea | — | 11.65 | 176 | 560 |
| 10 | 1.0 BSA | 3 | — | — | — | 8.57 | 176 | 2600 |
| 11 | 1.0 BSA | 9 | — | — | 16.7 DEG | 12.20 | 145 | 735 |
| 12 | 1.0 BSA | 8 | — | — | 16.7 DEG | 9.29 | 153 | 3310 |
| 13 | 10.0 PSA | 14 | — | — | 9.9 EG | 13.63 | 229 | 2790 |
| 14 | 10.0 PSA | 14 | — | — | 16.7 PEG 400 | 12.60 | 210 | 6825 |
| 15 | 10.0 PSA | 14 | — | — | 16.7 DTEG | 12.60 | 210 | 4150 |
| 16 | 10.0 PSA | 14 | — | — | 16.7 GL | 12.60 | 210 | 7120 |
| 17 | 10.0 PSA | 14 | — | — | 16.7 BD | 12.60 | 210 | 2800 |
| 18 | 1.0 BSA | 3 | — | — | 9.1 PG | 16.84 | 150 | 955 |
| 19 | 1.0 BSA | 11 | — | — | — | 14.85 | 169 | 1790 |
| 20 | 1.0 BSA | 2 | — | — | — | 15.19 | 173 | 1230 |
| 21 | 1.0 BSA | 3 | 0.01 Ag$_2$O | 0.01 aniline | — | 18.53 | 164 | 1745 |
| 22 | 1.0 BSA | 3 | — | — | 16.7 DEG | 10.0 | 137 | 9990 |
| 23 | 1.0 BSA | 12 | — | — | — | 5.83 | 194 | 5825 |
| 24 | 1.0 PSA | 4 | 1.01 Ag$_2$O | — | 33.3 DEG | 14.82 | 103 | 2300 |
| 25 | 1.0 PSA | 4 | 0.03 CuCO$_3$ | — | 33.3 DEG | 14.88 | 101 | 1250 |
| 26 | 1.0 BSA | 3 | 0.02 Ca(OH)$_2$ | 0.05 aniline | 33.3 DEG | 12.24 | 105 | 1670 |
| 27 | 1.0 NNSA | 3 | 0.02 Ba(OH)$_2$ | — | 33.3 DEG | 13.11 | 90 | 625 |
| 28 | 1.0 PSA | 4 | 0.05 CuO | 0.25 urea | 33.3 DEG | 14.35 | 89 | 680 |
| 29 | 1.0 PSA | 4 | 0.05 CuO | 0.25 urea | 33.3 DEG | 14.35 | 90 | 685 |
| 30 | 0.1 PSA | 3 | — | — | 9.1 DEG | 28.75 | 28 | 620 |
| 31 | 1.0 BSA | 3 | — | 0.02 melamine | 16.7 DEG | 15.32 | 138 | 1400 |
| 32 | 1.0 BSA | 10 | — | — | 16.7 DEG | 11.32 | 129 | 2180 |
| 33 | 1.0 BSA | 7 | — | — | 33.3 DEG | 12.08 | 108 | 2530 |
| 34 | 1.0 BSA | 5 | — | — | 33.3 DEG | 14.36 | 105 | 920 |
| 35 | 1.0 BSA | 3 | — | — | 9.1 DEG | 18.30 | 152 | 1105 |
| 36 | 1.0 TSA | 5 | — | — | 33.3 DEG | 13.39 | 104 | 1100 |
| 37 | 1.0 BSA | 1 | — | — | 14.1 DEG 17.0 H$_3$PO$_4$ | 16.73 | 302 | 250 |
| 38 | 1.0 NNSA | 5 | — | — | 24 DEG | 16.97 | 101 | 12600 |
| 39 | 1.0 BSA | 6 | — | — | 50.0 DEG | — | — | gel |
| 40 | 1.0 BSA | 5 | — | — | 16.7 DEG | — | — | gel |

TABLE 3

Preparation of Acid Agent from Aryl Sulphonic Acid Phenol and Aldehyde

| Example No. 1 | Aryl sulphonic acid, moles 2 | Phenolic component, moles 3 | Aldehyde component, moles 4 | Neutralizer, moles 5 | Nitrogen-containing compound, moles 6 | Diluent, % by weight 7 | Water content, % by weight 8 | Acid number mg. KOH g 9 | Viscosity at 20° C. cP 10 |
|---|---|---|---|---|---|---|---|---|---|
| 1 | 0.03 PSA | 1.0 phenol | 0.6 formalin | 0.01 Ag$_2$O | 0.01 aniline | — | 27.84 | 11 | 7760 |
| 2 | 5.0 BSA | 0.5 phenol 0.5 tricresol | 0.9 benzaldehyde | 0.01 CuCO$_3$ | 0.01 melamine | — | 4.02 | 269 | 1550 |
| 3 | 0.05 PSA | 1.0 tricresol | 0.3 formalin | 0.01 Ca(OH)$_2$ | 0.02 0.02 urea | — | 15.47 | 20 | 500 |
| 4 | 0.06 BSA | 1.0 phenol | 0.8 formalin | — | — | 50.0 DEG | 16.43 | 10 | 700 |
| 5 | 1.0 BSA | 1.0 phenol | 2.0 formalin | — | — | 30.0 PG | 23.54 | 92 | 85 |
| 6 | 1.0 PSA | 1.0 phenol | 0.3 formalin | 0.02 Ag$_2$O | — | 16.5 PEG-400 | 11.93 | 146 | 2350 |
| 7 | 1.0 PSA | 1.0 phenol | 0.3 formalin | — | — | 33.3 GL | 9.15 | 117 | 1820 |
| 8 | 1.0 BSA | 1.0 phenol | 0.6 formalin | 0.01 Ba(OH)$_2$ | 0.02 urea | 14.5 EG | 12.65 | 151 | 405 |
| 9 | 1.0 BSA | 1.0 phenol | 0.8 formalin | — | — | 16.7 DEG | 15.31 | 142 | 1350 |
| 10 | 1.0 BSA | 1.0 phenol | 1.0 formalin | — | 0.02 melamine | 33.3 DEG | 13.24 | 107 | 400 |
| 11 | 1.0 PSA | 1.0 phenol | 0.6 formalin | 0.02 Ca(OH)$_2$ | — | 33.3 DEG | 12.62 | 104 | 1020 |
| 12 | 1.0 NNSA | 1.0 phenol | 0.6 formalin | — | — | 33.3 DEG | 11.25 | 102 | 750 |
| 13 | 1.0 BSA | 1.5 phenol 1.5 resorcinol | 0.6 benzaldehyde | — | 0.02 aniline | 33.3 DEG | 3.15 | 113 | 2780 |
| 14 | 100.0 BSA | 1.0 phenol | 2.0 formalin | — | — | 9.10 DEG | 3.44 | 296 | 210 |
| 15 | 99.0 BSA 1.0 PSA | 0.5 resorcinol 0.5 m-cresol | 1.0 benzaldehyde 1.0 acetaldehyde | — | — | 16.7 DEG | 2.66 | 270 | 330 |
| 16 | 1.0 phenol | | 0.3 formalin | 0.05 CuO | — | 16.5 PG | 7.65 | 159 | 430 |
| 17 | 1.0 BSA | 1.0 phenol | 1.0 formalin | — | 0.25 urea | 33.3 PG | 13.76 | 103 | 460 |
| 18 | 1.0 PSA | 1.0 phenol | 0.6 formalin | 0.02 Ca(OH)$_2$ | — | 20.0 DEG 15.0 H$_3$PO$_4$ | 15.71 | 303 | 460 |
| 19 | 1.0 BSA | 1.0 phenol | 0.8 formalin | — | — | — | 18.37 | 170 | 2610 |
| 20 | 1.0 BSA | 1.0 phenol | 0.6 formalin | — | — | 16.7 DEG | 3.93 | 156 | 6650 |

What is claimed is:

1. An acid agent comprising a waterinsoluble product of concurrent reaction of a phenolic component selected from the group consisting of:
   (a) one mole of an hydroxy-(R)-methyl derivative of phenol having 0.4–2.0 moles of HO—CH(R)— substituents present per one mole of phenol, wherein R equals H—, H$_3$C—, or
   (b) one mole of phenol and 0.3–2.0 moles of an aldehyde, and
   (c) 0.03–100.0 moles of an aryl sulphonic acid; and having an acid number from 10 to 300 (mg.KOH/g) with a maximum water content of 35% by weight.

2. An acid agent according to claim 1, wherein the phenol moiety of the phenolic component is selected from the group consisting of: phenol, cresol, resorcinol, and naphthol.

3. An acid agent according to claim 1, wherein the aldehyde is selected from the group consisting of: formaldehyde, acetaldehyde, and benzaldehyde.

4. An acid agent according to claim 1, wherein the aryl sulphonic acid is selected from the group consisting of: benzene-, toluene-, phenol-, cresol-, naphthalene-, and naphthol- sulphonic acid.

5. An acid agent according to claim 1, which is a reaction product of said component (a) in which 0.7–2.0 moles of said HO—CH(R)— groups are present per one mole of phenol and said component (c), the acid agent containing a maximum of 50% by weight of an aliphatic monoatomic, or polyatomic alcohol.

6. An acid agent according to claim 1, which is a reaction product of said component (b) in which 0.7–2.0 moles of aldehyde are present per one mole of phenol and said component (c) containing a maximum of 50% by weight of an aliphatic monomeric, or polyatomic alcohol.

7. An acid agent according to claim 1, which also contains a maximum of 0.8 moles of a nitrogen-containing compound selected from the group consisting of: urea, an amine or an amide per one mole of an aryl sulphonic acid.

8. An acid agent according to claim 1, which contains a maximum of 0.1 moles of a metal sulphonate per one mole of an aryl sulphonic acid.

9. An acid agent according to claim 1, which contains a maximum of 20% by weight of ortho-phosphoric acid.

10. A continuous process for producing an acid agent comprising concurrently reacting a phenolic component selected from the group consisting of:
   (a) one mole of an hydroxy-(R)-methyl derivative of phenol having 0.4–2.0 moles of HO—CH(R)— substituents present per one mole of phenol, wherein R equals H—, H$_3$C—, or
   (b) one mole of phenol and 0.3–2.0 moles of an aldehyde, and
   (c) 0.03–100.0 moles of an aryl sulphonic acid; and having an acid number from 10 to 300

(mg.KOH/g) with a maximum water content of 35% by weight in a flow reactor for 0.1-10 minutes at 50°-150° C.

11. A process according to claim 10, wherein the phenol moiety of the phenolic component is selected from the group consisting of: phenol, cresol, resorcinol, and naphthol.

12. A process according to claim 10, wherein the aldehyde is selected from the group consisting of: formaldehyde, acetaldehyde, and benzaldehyde.

13. A process according to claim 10, wherein the aryl sulphonic acid is selected from the group consisting of: benzene-, toluene-, phenol-, cresol-, naphthalene-, and naphthol- sulphonic acid.

14. A process according to claim 10, wherein said component (a) has 0.7-2.0 moles of HO—CH(R)— groups present per one mole of phenol, and is reacted with said component (c) in the presence of a maximum of 50% by weight of an aliphtatic monoatomic, or polyatomic alcohol.

15. A process according to claim 10, wherein said component (b) has 0.7-2.0 moles of an aldehyde present per one mole of phenol, and is reacted with said component (c) in the presence of a maximum of 50% by weight of an aliphatic monomeric, or polyatomic alcohol.

16. A process according to claim 10, wherein the reaction is conducted in the presence of 0.8 moles of a nitrogen-containing compound selected from the group consisting of: urea, an amine or an amide per one mole of an aryl sulphonic acid.

17. A process according to claim 10, wherein a maximum of 10% by weight of an aryl sulphonic acid is neutralized with compounds forming a metal sulphonate.

18. A process according to claim 10, wherein said components are reacted in the presence of a maximum of 20% by weight of ortho-phosphoric acid.

* * * * *